United States Patent
Lomask et al.

(10) Patent No.: US 11,448,787 B2
(45) Date of Patent: Sep. 20, 2022

(54) FAULT THROW AUGMENTED FAULT DETECTION

(71) Applicant: Landmark Graphics Corporation, Houston, TX (US)

(72) Inventors: Jesse Mathias Lomask, Houston, TX (US); Kainan Wang, Houston, TX (US); Arnab Saha, Richmond, TX (US)

(73) Assignee: Landmark Graphics Corporation, Houston, TX (US)

( * ) Notice: Subject to any disclaimer, the term of this patent is extended or adjusted under 35 U.S.C. 154(b) by 509 days.

(21) Appl. No.: 16/466,717

(22) PCT Filed: Jan. 11, 2017

(86) PCT No.: PCT/US2017/013012
§ 371 (c)(1),
(2) Date: Jun. 5, 2019

(87) PCT Pub. No.: WO2018/132095
PCT Pub. Date: Jul. 19, 2018

(65) Prior Publication Data
US 2021/0286098 A1    Sep. 16, 2021

(51) Int. Cl.
*G01V 1/30* (2006.01)
(52) U.S. Cl.
CPC .............. *G01V 1/302* (2013.01); *G01V 1/308* (2013.01); *G01V 2210/1234* (2013.01); *G01V 2210/612* (2013.01); *G01V 2210/642* (2013.01)

(58) Field of Classification Search
CPC ........... G01V 1/302; G01V 1/308; G01V 2210/1234; G01V 2210/612; G01V 2210/642
See application file for complete search history.

(56) References Cited

U.S. PATENT DOCUMENTS

| 6,791,900 B2* | 9/2004 | Gillard ..................... G01V 1/30 367/40 |
| 2003/0023383 A1 | 1/2003 | Stark |
| 2003/0112704 A1* | 6/2003 | Goff ......................... G01V 1/30 367/72 |
| 2004/0098200 A1* | 5/2004 | Wentland ............... G01V 11/00 702/2 |
| 2009/0093965 A1 | 4/2009 | Godfrey et al. |
| 2016/0070012 A1 | 3/2016 | Rutten |
| 2016/0377752 A1 | 12/2016 | Cavelius et al. |

FOREIGN PATENT DOCUMENTS

| CN | 102866424 A * | 1/2013 | ............... G01V 1/28 |
| WO | 2014001750 A2 | 1/2014 | |
| WO | WO-2014185898 A1 * | 11/2014 | ............... G01V 1/28 |
| WO | 2018132095 A1 | 7/2018 | |

* cited by examiner

*Primary Examiner* — Mischita L Henson
(74) *Attorney, Agent, or Firm* — Tenley Krueger; Parker Justiss, P.C.

(57) ABSTRACT

A fault indicator calculator, a method for determining a fault indicator, and a fault indicator calculating system are disclosed herein. One embodiment of a fault indicator calculator includes: 1) an interface configured to receive seismic data, and 2) a processor configured to scan a manifold-shaped operator through said seismic data at a range of dips and azimuths and calculate fault throws at various orientations of said dips and azimuths independent of determining other fault indicators.

20 Claims, 4 Drawing Sheets

FAULT THROW AUGMENTED FAULT DETECTION

CROSS-REFERENCE TO RELATED APPLICATION

This application is the National Stage of, and therefore claims the benefit of, International Application No. PCT/US2017/013012 filed on Jan. 11, 2017, entitled "FAULT THROW AUGMENTED FAULT DETECTION," which was published in English under International Publication Number WO 2018/132095 on Jul. 19, 2018. The above application is commonly assigned with this National Stage application and is incorporated herein by reference in its entirety.

BACKGROUND

In geology, a fault is a planar fracture or discontinuity in a volume of rock, across which there has been significant displacement as a result of rock mass movement. Large faults within the Earth's crust result from the action of plate tectonic forces, with the largest forming the boundaries between the plates, such as subduction zones or transform faults. Energy release associated with rapid movement on active faults is the cause of most earthquakes.

Faults have a variety of geometry. They can be, for example, planar, cuspate (curved), growth (curved vertically with increasing throw with depth), or en echelon (a series of almost-parallel fault). They can also be connected to each other in various configurations and can be split into two or more faults. Fault throw in general, but not always, tends to increase towards the center of the fault plane and decrease towards the tip-line (where the fault terminates).

Several methods for highlighting faults, that is, for computing 3D images of faults from 3D seismic images, are commonly used today. Some compute a measure of the continuity of seismic reflections, such as semblance or other forms of coherence. Others compute a measure of discontinuity, such as variance, entropy, or gradient magnitude. One current method calculates fault attributes based on the gradient structure tensor in elongated averaging windows oriented over ranges of dips and azimuths. All of these methods are based on the observation that faults may exist where continuity in seismic reflections is low or, equivalently, where discontinuity is high and there is displacement.

Another method for highlighting faults uses oriented averaging windows based on semblance. With this method, the computed fault attributes are capable of detecting and highlighting faults even when the seismic events locally appear continuous. These fault attributes obtained from oriented averaging windows based on semblance are more continuous and are more "fault-like." A maximum likelihood volume acts as a proxy for the faults which helps in optimizing the interactive fault picking interpretation workflow and provides enhanced user control for analyzing and creating the desired faults and fault surfaces.

BRIEF DESCRIPTION

Reference is now made to the following descriptions taken in conjunction with the accompanying drawings, in which.

DETAILED DESCRIPTION

Another fault attribute used to identify faults is fault throw. A fault throw measures the shifts needed to correlate seismic events on one side of a fault to their correspondences on the other side of the fault. While fault likelihood may be non-zero outside of a fault, using fault throw as a fault attribute can be beneficial since throws are typically only non-zero at a fault. For example, the difference between faults and fractures is that faults have throw while a fracture does not. A very good indicator, in fact, for a fault is an orientation (based on dips or azimuths) having a maximum fault throw. None of the previous fault likelihood estimating methods, however, calculate a fault throw directly from the seismic data. It is realized a computationally feasible method for calculating fault throw inside a fault likelihood algorithm would be advantageous.

Accordingly, the disclosure provides an apparatus and method that calculate an improved fault indicator for predicting fault locations. Disclosed herein is a fault indicator estimator that calculates fault throw as a fault indicator. Calculating fault throws within a fault likelihood computation can provide multiple benefits, such as, assisting with interpretations of a "broken" fault, defining the top or bottom of a fault, and helping to exclude discontinuities caused by a non-fault. A "broken" fault is a single fault split into segments due to noise. Fault throw is generally used to refer to various attributes that include fault offset, fault slip, fault slip distribution, fault contours, Allan diagrams, etc. Thus, the fault indicator estimator and methods disclosed herein can provide noise-less, better defined fault images compared to the current generation of fault likelihood attribute. As such, the disclosed features improve the function of computers in the determination of fault likelihood. With improved fault likelihoods, determining the location of faults and retrieving hydrocarbons via drilling can be improved. The resulting fault images can be used with automated fault interpretation (AFI) to assist in, for example, the exploration and gathering of underground natural resources.

Figure 1A:
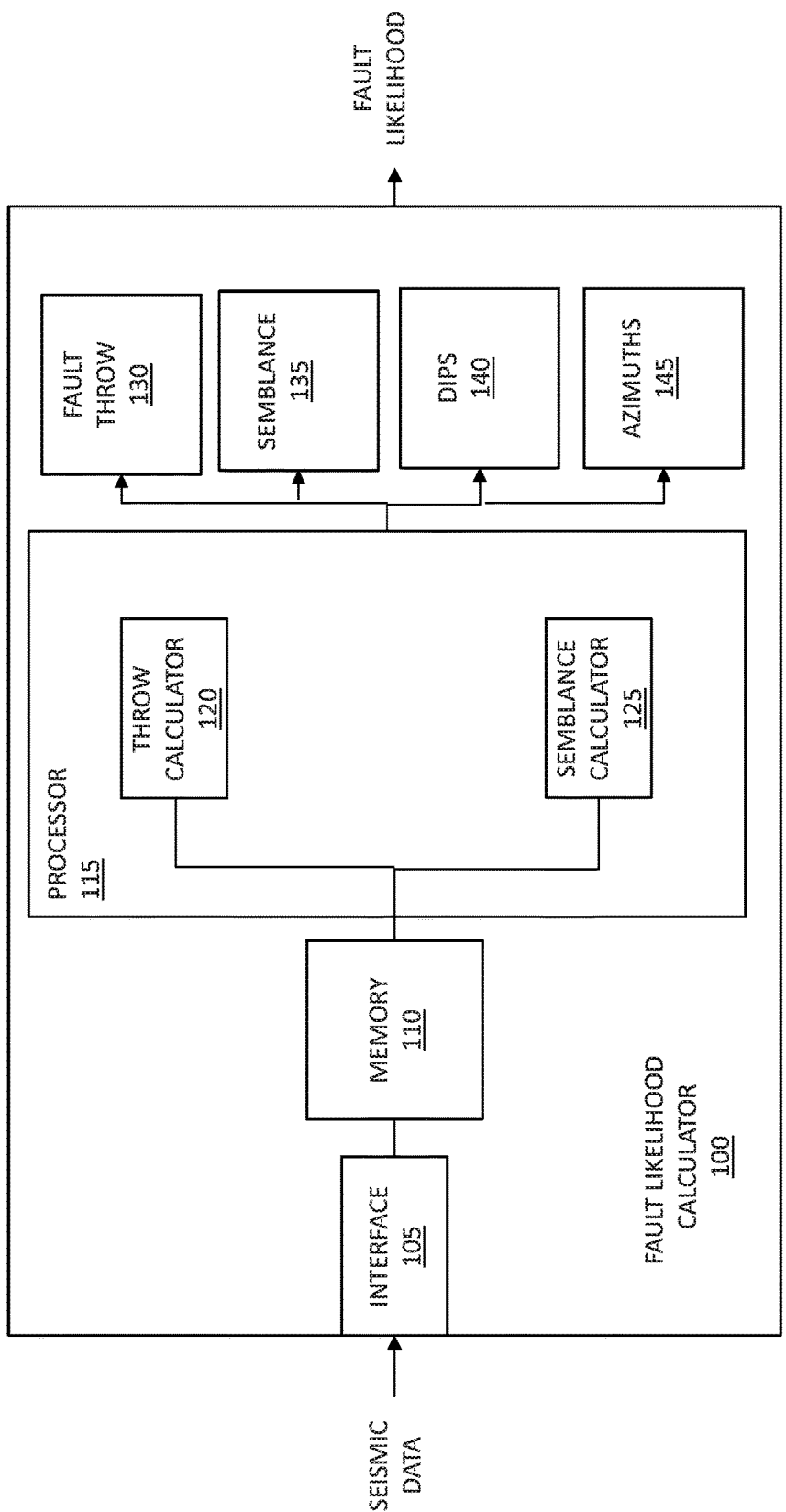
FIG. 1A is a block diagram for a fault indicator calculator.

Turning now to the Figures, FIG. 1A is a block diagram of a fault indicator calculator 100 that estimates fault likelihood according to the principles of the disclosure. The fault indicator calculator 100 can be implemented on a computer. The fault indicator calculator 100 includes an interface 105, a memory 110, and a processor 115. The interface 105, the memory 110 and the processor 115 can be connected together via conventional means.

The interface 105 is configured to receive seismic data for the fault indicator calculator 100. The interface 105 can be a conventional interface that is used to receive and transmit data. The interface 105 can include multiple ports, terminals or connectors for receiving or transmitting the data. The ports, terminals or connectors may be conventional receptacles for communicating data via a communications network. The seismic data can be gathered employing conventional methods and equipment. The seismic data can also be delivered to the interface 105 via conventional means.

The memory 110 may be a conventional memory that is constructed to store data and computer programs. The memory 110 includes a data reservoir configured to store data needed for the fault indicator calculator 100. The memory 110 may store operating instructions to direct the operation of the processor 115 when initiated thereby. The operating instructions may correspond to algorithms that provide the functionality of the operating schemes disclosed herein. For example, the operating instructions may correspond to the algorithm or algorithms that calculate fault throw, semblance, or a combination thereof at various orientations. In one embodiment, the memory 110 or at least a portion thereof is a non-volatile memory. The memory 110 may be distributed over multiple locations or devices.

The processor 115 is configured to operate the fault indicator calculator 100. The processor 115 includes a fault throw calculator 120 and a semblance calculator 115. In one embodiment, the memory 110 or a portion thereof may be part of the processor 115. The processor 115 may be a distributed processor where multiple computers are used for distributed processing. The multiple computers can be connected via a communications network, such as the Internet. The multiple computers may be connected to provide parallel processing.

Figure 1B:
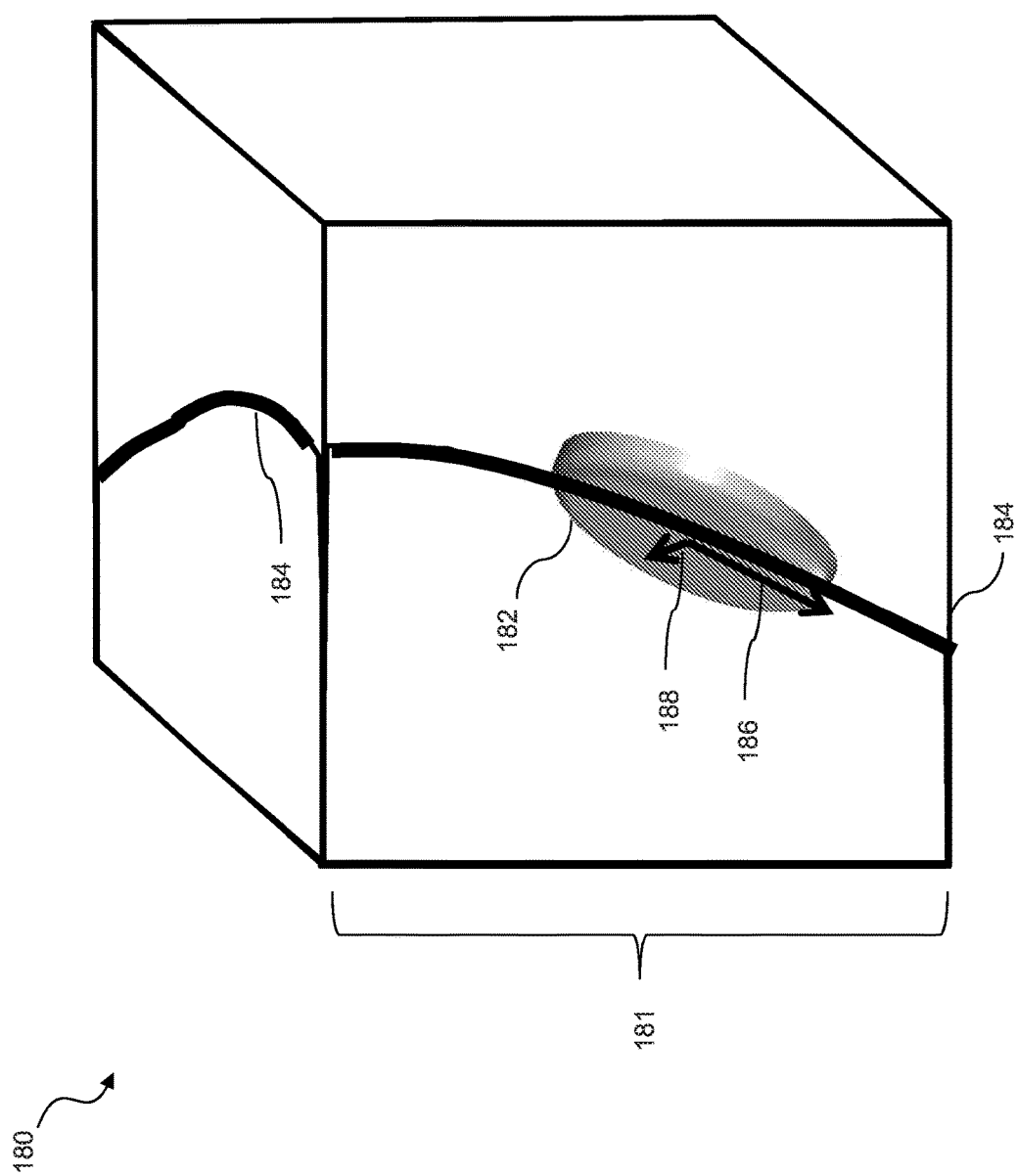
FIG. 1B shows an illustration of a 3D volume of seismic data and a disk shaped operator being moved therethrough.

The fault throw calculator 120 is configured to scan a manifold-shaped operator through the seismic data at a range of dips and azimuths and calculate fault throws at various orientations of the dips and azimuths. The shape of the manifold-shaped operator can vary in different embodiments and can be a 2D or a 3D operator. The shape can be, for example, a rectangle, a rhombus, or a circle for a 2D operator, or a rectangular cuboid, a rhomboid, or a disk for a 3D operator. As an example, FIG. 1B provides an illustration of a 3D volume of seismic data 180 and a manifold-shaped operator, disk-shaped operator 182 being moved through the 3D volume of seismic data 180. The seismic data 180 includes various layers 181 and a fault 184. A dip 186 and azimuth 188 of the disk-shaped operator 182 as it moves through the fault 184 are also illustrated. A non-zero fault throw occurs along the fault 184 between the two sequences of data on each side of the disk-shaped operator 182 at, for example, a single sample at the center of the disk. The lowest semblance and maximum likelihood also occur as the orientation of the disk-operator aligns with the fault 184 in FIG. 1B.

As noted above, a fault throw measures the shifts needed to correlate seismic events on one side of a fault to their correspondences on the other side of the fault. There are various methods to estimate fault throws, such as dynamic time warping (DTW) and cross correlation. In different embodiments, the throw calculator 120 employs DTW to calculate fault throws at the various orientations. For example, for two sequences $S_1$ and $S_2$ of seismic data, the throw calculator 120 employs a DTW algorithm to model the objective of correlation as a sample wise shifting vector $\tau$ that minimizes the error as shown in equation 1:

$$\min \Sigma_{i=1}^{n}(S_1(i)-S_2(i+\tau(i)))^2. \qquad \text{Eq. 1}$$

For certain embodiments, wherein fault planes are represented as manifolds in 3D datasets, the objective can be generalized according to equation 2:

$$\min \Sigma_{j=1}^{m}\Sigma_{i=1}^{n}(S_{j_1}(i)-S_{j_2}(i+\tau(i,j)))^2. \qquad \text{Eq. 2}$$

In equations 1 and 2, i, j, m, and n corresponds to grid indexes and grid size associated with DTW.

After solving such a problem, a 1D vector of shifts for 2D datasets, or a 2D field of shifts for 3D data sets, at each sample of the seismic image can be obtained. The sample of seismic data can be a 3D volume or a 2D line. In one embodiment, a weighted sum of these shifts is taken as an estimate of the throw at this sample. The weights can be chosen from, for example, a Gaussian kernel centered at this sample.

During the scanning process, any continuous variations such as dipping beds will ideally have a zero throw under some shear transformation, whereas a discontinuity such as a fault will always have a non-zero throw. For example, faults in seismic data can sometimes appear locally continuous when the throw is such that the squiggly lines of the seismic data align peaks and troughs creating the illusion of continuity. In addition, when the shear transformation makes a target fault vertical, the throw attains its maximum among all shear transformations. As such, a maximum weighted averaged throw can be used as a fault indicator. In other embodiments, different statistical measures could be used instead of the average, such as variance, bimodal, median, extreme value and entropy.

The fault throw calculator 120 can calculate fault throws independent of calculating any other fault indicators, such as coherence, semblance or discontinuity. For example, the fault throw calculator 120 can determine fault throws without first determining semblance. The fault throw calculator 120 can also determine fault throws while determining semblance at the different orientations. As such, the throw calculator 120 and the semblance calculator 125 can calculate both fault throws and semblance at different orientations as the disk-shaped operator 182 is moved through the seismic data.

The semblance calculator 125 is configured to scan a manifold-shaped operator, such as the disk-shaped operator 182, through the seismic data at a range of dips and azimuths and calculate semblance at the various orientations. In other embodiments, the semblance calculator 125 can be configured to calculate any other fault indicator, such as variance, entropy or gradient magnitude. Yet in other embodiments, the semblance calculator 125 can be configured to calculate different edge detectors, such as sobel, canny, laplacian, etc. When the semblance calculator 125 finds the orientation with the minimum semblance (maximum likelihood), then the semblance calculator 125 will also know the dip and azimuth of the fault. Semblance can be calculated according to a well-known algorithm in the art and presented below as equation 3:

$$\text{semblence} = \frac{\langle (\text{image})_s^2\rangle_f}{\langle (\text{image}^2)_s\rangle_f} \qquad \text{Eq. 3}$$

In Eq. 3 the inner bracket ($\langle\ \rangle_s$) represents smoothing along the gradient structure, e.g., the spatial features of the seismic image from the seismic data. The outer bracket ($\langle\ \rangle_f$) represents smoothing along the manifold-shaped operator.

The semblance calculator 125 and the throw calculator 120 are configured to calculate semblance and fault throws independent of each other. The throw calculator 120 can determine the fault throws and obtain the orientations with the maximum fault throw before the semblance calculator 125 calculates semblance. Alternatively, the semblance calculator 125 can determine semblance and obtain the orientations where semblance is minimized before the throw calculator 120 calculates the fault throws. In some embodiments, the processor 115 models an optimum solution to both the throw calculations from the throw calculator 120 and semblance calculations from the semblance calculator 125 employing a function f(s,t) where s is the semblance and t is the throw.

The fault indicator calculator 110 is also configured to output 3D images based on the following four attributes: fault throw 130, semblance 135, dip 140 and azimuth 145. Dips and azimuths represent the orientation of the plane of the optimum combination of semblance and throw and are also useful for visualization and quantitative analysis. Thus, the dip 140 and the azimuth 145 can be considered as attributes and as the location or orientation where the fault throw 130 and the semblance 135 occur. The 3D images can be provided to a display for review and analysis. The fault throw 130 alone can be used as an indicator to predict fault likelihood at various locations. In other applications, the semblance 135 combined with the fault throw 130 can be used together to predict fault likelihood at various locations of the seismic data. In one embodiment, the fault indicator calculator 100 can separately output orientation volumes of likelihood, dips and azimuths for minimum semblance plane and maximum fault throw. The fault likelihood can be visually represented on a display as an image or numerically. In some embodiments, the fault likelihood calculator 100 includes a display that is configured to visually represent the seismic data and the fault likelihood.

Figure 2:
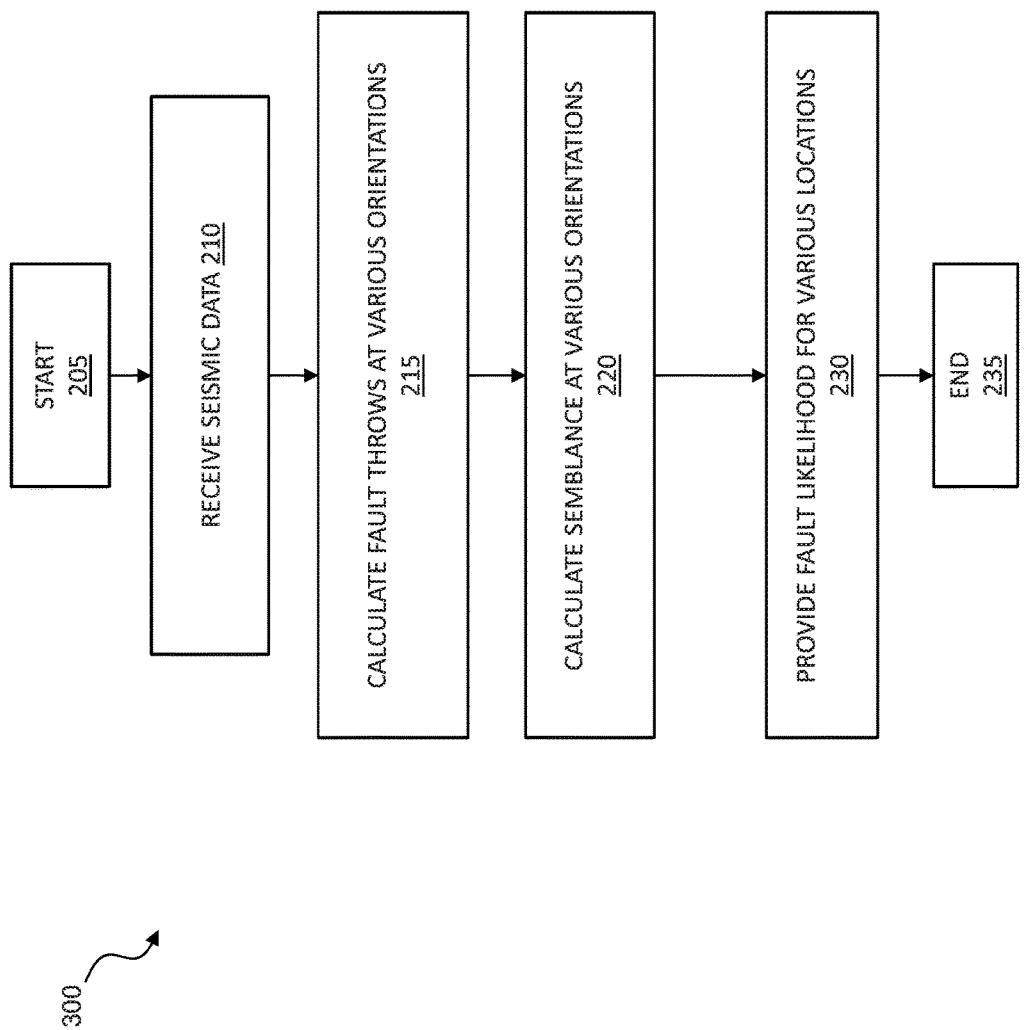
FIG. 2 is a flowchart for a method of calculating fault indicators.

FIG. 2 is a flowchart of a method 200 for calculating fault indicator. The method 200 may be carried out by an apparatus such as the fault indicator calculator 100 described in FIG. 1A. Fault indicators, such as fault throws and semblance, are determined by the method 200. At least one of the fault indicators are used to provide a fault likelihood. The method begins at a step 205.

At a step 210, seismic data is received. The seismic data can be obtained and delivered via conventional methods or procedures of the industry. At a step 215, fault throws at various orientations are calculated by scanning a manifold-shaped operator through the seismic data over a range of dips and azimuths. At a step 220, semblance at various orientations are calculated by scanning the manifold-shaped operator through the seismic data over a range of dips and azimuths. In some embodiments, semblance is determined via conventional processes or means. Steps 215 and 220 can be calculated independently of each other. Additionally, step 220 can be calculated before step 215. The dips and azimuths are determined for the fault throws and the semblance during steps 215 and 220.

Fault likelihood is provided in a step 230 for various locations corresponding to the seismic data based on at least one of the fault indicators. The fault likelihood can be visually represented on a display by 2D or 3D images based on the fault attributes. The method 200 ends in a step 235.

Figure 3:
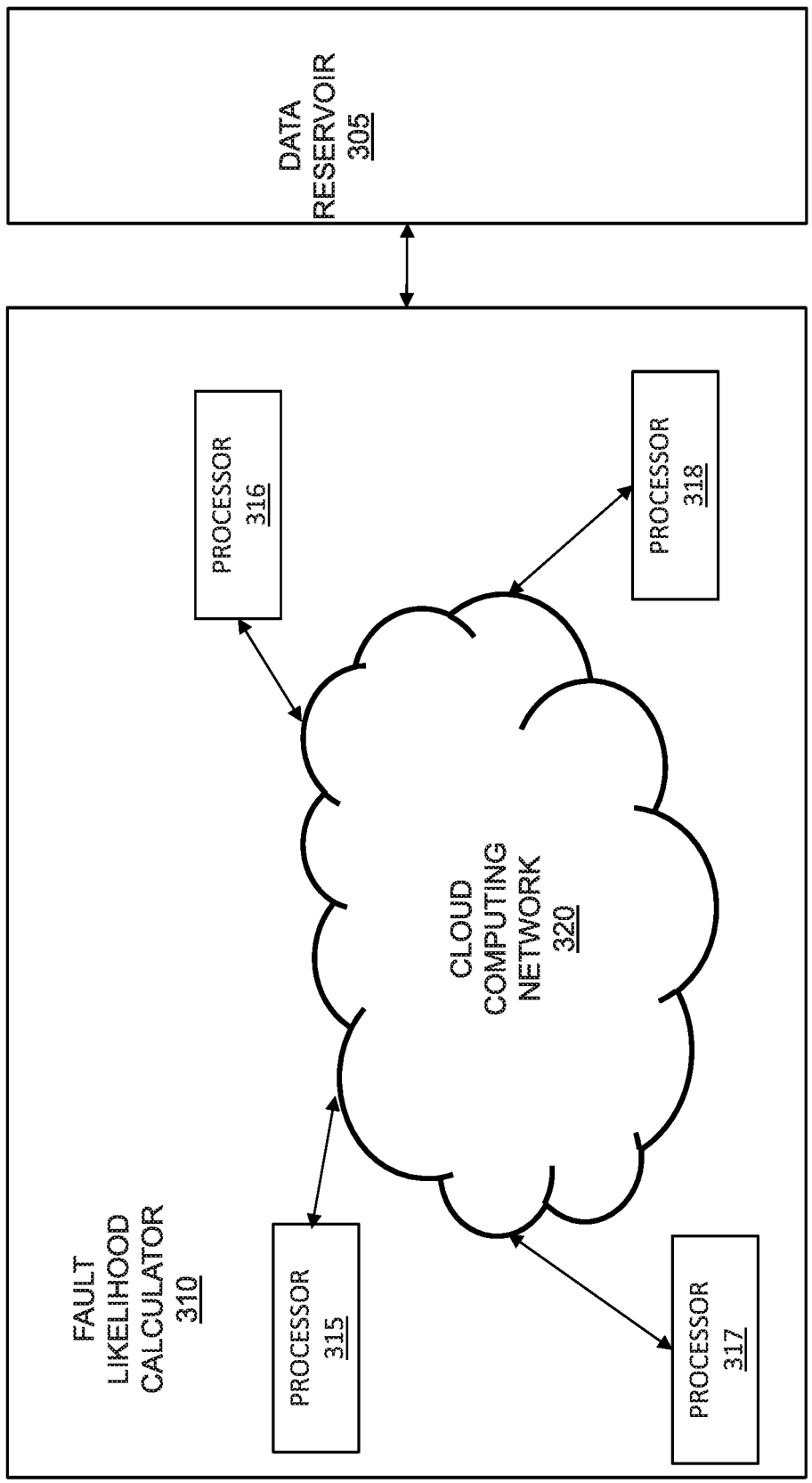
FIG. 3 is a diagram for a cloud-based fault indicator calculating system.

FIG. 3 is a diagram of a cloud-based fault indicator calculating system 300. The cloud-based fault indicator calculating system 300 provides a network of processors that can be used to calculate fault throws. The cloud-based fault indicator calculating system 300 can be a cloud computing platform.

The cloud-based fault indicator calculating system 300 includes a data reservoir 305 and a fault indicator calculator 310. The data reservoir 305 is configured to store seismic data. The seismic data can be typical seismic data that is obtained and used in the industry to determine fault likelihood. The fault indicator calculator 310 includes multiple processors, represented by processors 315, 316, 317, 318, connected to or a part of a cloud computing network 320. The processors 315, 316, 317, 318, and cloud computing network 320 can be connected via conventional means. One skilled in the art will understand that the number of processors can vary.

The multiple processors 315, 316, 31, 318, are configured to perform the functionality associated with the processor 115 in FIG. 1A, the method 200 described in FIG. 2, or at least a portion thereof. The multiple processors 315, 316, 317, 318, may be digital data processors or computers, wherein the computers are programmed or store executable programs or sequences of software instructions to perform one or more of the steps of the method 200. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the method described in FIG. 2 or components of the apparatus described in FIG. 1A.

Accordingly, the above-described system, apparatus, and methods or at least a portion thereof may be embodied in or performed by various processors, such as digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system or apparatus described herein.

Certain embodiments disclosed herein can further relate to computer storage products with a non-transitory computer-readable medium that have program code thereon for performing various computer-implemented operations that embody the apparatuses, the systems or carry out the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Embodiments disclosed herein include:

A. A fault indicator calculator, including an interface configured to receive seismic data, and a processor configured to scan a manifold-shaped operator through the seismic data at a range of dips and azimuths and calculate fault throws at various orientations of the dips and azimuths independent of determining other fault indicators.

B. A method for determining a fault indicator, including receiving seismic data, scanning a manifold-shaped operator through the seismic data at a range of dips and azimuths, calculating fault throws at various orientations of the dips and azimuths independent of other fault indicators, and predicting fault locations based on the fault throws.

C. A fault indicator calculating system, including a seismic data reservoir configured to store seismic data, and a cloud computing network having multiple processors configured to cooperate to predict fault locations from the seismic data by scanning a manifold-shaped operator through the seismic data at a range of dips and azimuths, calculate the fault throws at various orientations of the dips and azimuths independent of other fault indicators, and predict the fault locations based on the fault throws.

Each of embodiments A, B, and C may have one or more of the following additional elements in combination:
Element 1: wherein the processor is further configured to calculate at least one additional fault indicator at the various orientations. Element 2: wherein the processor is further configured to calculate the fault throws based on dynamic time warping, wherein shifting vectors are obtained for each image sample of the seismic data. Element 3: wherein the processor is further configured to calculate a fault throw at the each image sample based on a weighted combination of all the shifting vectors for the each image sample, wherein the each image sample corresponds to the disk shaped operator at each of the various orientations. Element 4: wherein the processor is configured to predict fault locations based on the fault throws. Element 5: wherein the processor is configured to predict fault locations using the fault throws and the semblance. Element 6: wherein the processor is configured to generate 3D fault images based on the dips, the azimuths, the fault throws and the semblance. Element 7: calculating at least one other additional fault indicator at the various orientations. Element 8: calculating the fault throws based on dynamic time warping, wherein shifting vectors are obtained for each image sample of the seismic data. Element 9: calculating a fault throw at the each image sample based on a weighted sum of all the shifting vectors for the each image sample, wherein the each image sample corresponds to the disk shaped operator at each of the various orientations. Element 10: calculating an additional fault indicator that equals to the maximum weighted average of all the fault throws. Element 11: predicting predict fault locations using the fault throws and the semblance. Element 12: generating 3D fault images based on the dips, the azimuths, the fault throws and the semblance. Element 13: wherein the cloud computing network is further configured to calculate at least one additional fault indicator at the various orientations. Element 14: wherein the cloud computing network is further configured to calculate the fault throws based on dynamic time warping, wherein shifting vectors are obtained for each image sample of the seismic data. Element 15: wherein the cloud computing network is further configured to calculate a fault throw at the each image sample based on a weighted sum of all the shifting vectors for the each image sample, wherein the each image sample corresponds to the disc shaped operator at each of the various orientations. Element 16: wherein the cloud computing network is configured to predict fault locations using the fault throws and the semblance. Element 17: wherein the cloud computing network is configured to generate 3D fault images based on the dips, the azimuths, the fault throws and the semblance.

What is claimed is:

1. A fault indicator calculator, comprising:
   an interface configured to receive seismic data; and
   a processor configured to generate fault images from said seismic data based on fault throws determined independent of determining other fault indicators from said seismic data, said processor configured to independently determine said fault throws by moving a manifold-shaped operator through said seismic data at a range of dips and azimuths and calculating said fault throws at various orientations of said dips and azimuths, wherein said fault images visually represent said moving of said manifold-shaped operator and one or more likely fault locations based on said fault throws.

2. The fault indicator calculator as recited in claim 1, wherein said processor is further configured to calculate at least one additional fault indicator at said various orientations.

3. The fault indicator calculator as recited in claim 1, wherein said processor is further configured to calculate said fault throws based on dynamic time warping, wherein shifting vectors are obtained for each image sample of said seismic data.

4. The fault indicator calculator as recited in claim 3, wherein said processor is further configured to calculate a fault throw at said each image sample based on a weighted combination of all said shifting vectors for said each image sample, wherein said each image sample corresponds to said manifold-shaped operator at each of said various orientations.

5. The fault indicator calculator as recited in claim 1, wherein said likely fault locations are used in retrieving hydrocarbons.

6. The fault indicator calculator as recited in claim 2, wherein said at least one additional fault indicator is semblance and said likely fault locations are based on said fault throws and said semblance.

7. The fault indicator calculator as recited in claim 1, wherein said fault images are 3D fault images.

8. A method for determining a fault indicator, comprising:
   receiving seismic data;
   scanning a manifold-shaped operator through said seismic data at a range of dips and azimuths;
   calculating fault throws at various orientations of said dips and azimuths independent of other fault indicators;
   predicting one or more fault locations based on said fault throws; and
   retrieving hydrocarbons based on said fault locations.

9. The method for determining a fault indicator according to claim 8, further comprising calculating at least one other additional fault indicator at said various orientations.

10. The method for determining a fault indicator according to claim 8, comprising calculating said fault throws based on dynamic time warping, wherein shifting vectors are obtained for each image sample of said seismic data.

11. The method for determining a fault indicator according to claim 10, further comprising calculating a fault throw at said each image sample based on a weighted sum of all said shifting vectors for said each image sample, wherein said each image sample corresponds to said manifold-shaped operator at each of said various orientations.

12. The method for determining a fault indicator according to claim 11, further comprising calculating an additional fault indicator that equals to the maximum weighted average of all said fault throws.

13. The method for determining a fault indicator according to claim 9, further comprising calculating an additional fault indicator that is semblance and predicting said fault locations using said fault throws and said semblance.

14. The method for determining a fault indicator according to claim 13, further comprising generating 3D fault images based on said dips, said azimuths, said fault throws and said semblance.

15. A fault indicator calculating system, comprising:
   a seismic data reservoir configured to store seismic data; and
   a cloud computing network including multiple processors configured to cooperate to predict one or more fault locations using fault images generated from said seismic data, wherein said fault images are generated based on fault throws determined by moving a manifold-shaped operator through said seismic data at a range of dips and azimuths, calculating said fault throws at various orientations of said dips and azimuths independent of other fault indicators, wherein said fault images visually represent said moving of said manifold-shaped operator and said fault locations are based on said fault throws.

16. The fault indicator calculating system as recited in claim 15, wherein said cloud computing network is further configured to calculate at least one additional fault indicator at said various orientations.

17. The fault indicator calculating system as recited in claim 15, wherein said cloud computing network is further configured to calculate said fault throws based on dynamic time warping, wherein shifting vectors are obtained for each image sample of said seismic data.

18. The fault indicator calculating system as recited in claim 17, wherein said cloud computing network is further configured to calculate a fault throw at said each image sample based on a weighted sum of all said shifting vectors for said each image sample, wherein said each image sample corresponds to said manifold-shaped operator at each of said various orientations.

19. The fault indicator calculating system as recited in claim 16, wherein said at least one additional fault indicator is semblance and said cloud computing network is configured to predict said fault locations using said fault throws and said semblance.

20. The fault indicator calculating system as recited in claim 19, wherein said fault locations are used in retrieving hydrocarbons.

* * * * *